United States Patent [19]
Tarangul

[11] 3,852,475
[45] Dec. 3, 1974

[54] TOPICAL COMPOSITIONS CONTAINING PETROLATUM AND HYDROPHOBIC STARCH

[75] Inventor: Emil V. Tarangul, Clinton, Conn.

[73] Assignee: Chesebrough-Pond's Inc., Greenwich, Conn.

[22] Filed: July 28, 1972

[21] Appl. No.: 276,121

Related U.S. Application Data

[63] Continuation of Ser. No. 868,576, Oct. 22, 1969, abandoned.

[52] U.S. Cl. ............... 424/361, 424/180, 424/355
[51] Int. Cl. .......................... A61k 9/00, A61k 9/06
[58] Field of Search ............... 424/361, 180, 355

[56] References Cited
UNITED STATES PATENTS 2,613,206  10/1952  Caldwell .................. 424/361 UX
2,661,349  12/1953  Caldwell .................. 424/361 UX

OTHER PUBLICATIONS

Faust, Amer. Perf. & Cos., Vol. 78, No. 10, Oct. 1963, pp. 51–54.
Frazier, A Formulary for External Therapy of the Skin, Thomas, Springfield, Ill., 1954, pp., 37–51, 66–69.

Primary Examiner—Albert T. Meyers
Assistant Examiner—Anna P. Fagelson

[57] ABSTRACT

This invention relates to compositions for topical application containing solid petrolatum and hydrophobic starch. The inclusion of hydrophobic starch in topical compositions containing solid petrolatum as an emollient reduces the greasy appearance and feed normally associated with such petrolatum containing compositions, as well as reducing their resistance to washing with cold water soap and detergent compositions.

2 Claims, No Drawings

TOPICAL COMPOSITIONS CONTAINING PETROLATUM AND HYDROPHOBIC STARCH

This is a continuation of application Ser. No. 868,576, filed Oct. 22, 1969, now abandoned.

Solid petrolatum or petroleum jelly, hereinafter referred to as petrolatum, has been widely used as a therapeutic agent for topical application to wounds, burns, and other infected areas. This therapeutic agent possesses well known lubricating, softening and skin-conditioning characteristics.

Petrolatum consists of a mixture of hydrocarbons (including mineral oil and microcrystalline hydrocarbon waxes) of such nature that when melted material is cooled to ordinary room temperature it congeals to a translucent, apparently amorphous or jelly-like material.

The U.S. Pharmacopeia (U.S.P.) uses the terms white petrolatum and white petroleum jelly as being the same and describes it as a purified mixture of semi-solid hydrocarbons obtained from petroleum and wholly or nearly decolorized. It is further defined as having a melting point range of 38°C. to 60°C. or 100.4°F. to 140°F. and as having a consistency as determined by the U.S.P. official method of not less than 100 and not more than 275. A lesser decolorized grade is described in the National Formulary (N.F.) as a "yellow" grade and as free or nearly free from odor and taste.

Among the many attributes of petrolatum, which make its use in topical applications advantageous are: its water barrier property; water repellency; resistance to being washed off by water; physiological inertness, chemical inertness and stability; and, its consistency and viscosity which permits easy application and desirable film-forming properties.

The chief drawbacks of petrolatum as a topical ointment are its greasiness and resistance to washing in cold soap and detergent solutions.

It is an object of this invention therefore to eliminate the above-mentioned disadvantages of petrolatum without affecting its useful functions. More particularly, it is an object of this invention to provide improved modified petrolatum compositions (and methods for producing same) which feel and appear less greasy when applied to the skin than conventional petroleum jelly.

Another object of the invention is to provide improved modified petrolatum compositions (and method for producing same) which retain the film-forming and water barrier properties of petroleum jelly but which are less resistant to removal by washing with cold soap and detergent solutions. A still further object of this invention is to provide improved petrolatum compositions (and methods for producing same) having the attributes set forth in the foregoing objects and which do not promote the growth of bacteria on the skin.

It has been found that the objects of this invention may be realized by including hydrophobic starch as an essential component of the petroleum jelly-containing ointment composition. As is well known to those versed in the field of starch chemistry, hydrophobic starch is starch which has been modified to impart thereto hydrophobic groups which render the starch hydrophobic in nature rather than hydrophyllic as is conventional non-modified starch. Hydrophobic starches are described in numerous scientific publications and patents such, for example, as:

Cosmetic Science and Technology, Ed. E. Sagarin, Interscience Publishers, New York City, 1957, pp. 869, 870.

Wurzburg, O. and Herbst, W. "Key Properties of Starch," Amer. Perfumer 76, 23–25 (Oct. 1961)

Faust, R. E. "Starches in Topical Preparations" Amer. Perfumer 78, 51–54 (Oct. 1963)

Ginrod, J. "Non-Gelling Starch Derivatives" Chemical Products 379–381 (Oct. 1959)

Alexander, P. "Baby Toiletries" Specialties 7–16 (Feb. 1966)

Schimmel Briefs No. 215 (Feb. 1953)

Bulletin No. 211 Rev. National Starch and Chem. Corp., N.Y.C.

| U.S. Patents: | | | |
|---|---|---|---|
| 2,613,206 | Caldwell | Oct. | 7, 1952 |
| 2,661,349 | Caldwell et al. | Dec. | 1, 1953 |
| 2,864,743 | Kottler et al. | Dec. | 16, 1958 |
| 2,852,404 | Satterthwaite | Sept. | 16, 1958 |
| 2,961,339 | Wolff | Nov. | 22, 1960 |
| 3,071,492 | Satterly | Jan. | 1, 1963 |

Any of the hydrophobic starches described in the above-mentioned patents and publications may be used as the starch component in formulating the compositions of this invention.

The most common forms of hydrophobic starch are starch esters containing hydrophobic groups and complex ethers of starch. Hydrophobic starches of the aforedescribed type are not easily swelled by water but will absorb considerable water without forming a paste.

Specific examples of hydrophobic starch are commercial products sold under the trade names ANM STARCH and DRY FLO.

ANM STARCH is a complex ether of starch formed by the action of the tetramethylol derivative of acetylene diureine on starch. It does not swell in hot water but is even more absorbent than untreated starch.

DRY FLO is an aluminum salt of a low substituted starch octenyl succinic half ester containing hydrophobic groups. It is extremely resistant to wetting by water while retaining the capacity of starch to absorb water without swelling. This starch is also characterized by its free flowing properties even after absorption of considerable water.

The compositions of the instant invention do not feel or appear greasy when applied to the skin. They retain film-forming and water barrier properties of petroleum jelly but are less resistant to removal by washing with cold soap and detergent solutions. The property of hydrophobic starch to absorb water even though it repels water results in a film of the improved petrolatum composition of this invention being more permeable to perspiration than petroleum jelly alone.

Because the hydrophobic starch in the composition is insoluble in water, it does not form a paste in the presence of moisture, perspiration or urine. The combination does not promote the growth of bacteria on the skin.

When a composition of the present invention was compared with non-modified petrolatum in panel tests, the panelists readily perceived that it was less greasy, had better texture, was more pleasant to apply and easier to remove. At the same time they reported that it was as effective or more effective than petrolatum for such purposes as soothing, softening and protecting the skin.

While the present invention is not based on any theory of action, one possible explanation for the reduction in greasy appearance and feel is that the hydrophobic starch grains are a size which cannot be perceived as individual particles when applied to the skin. When the composition is applied to the skin, the starch particles absorb the light that would normally be reflected from a film containing only petroleum jelly. The skin looks less greasy. The hydrophobic starch absorbs moisture without forming a sticky paste. This mitigates the hot, heavy feeling of petrolatum alone. The skin feels less greasy.

The amount of hydrophobic starch that is present depends upon the extent of reduction of greasiness and reduction of resistance to washing by cold soap and detergent solutions that is desired. As the amount of hydrophobic starch increases, the desired reductions in greasiness and resistance to washing with cold soap and detergent solutions increase. The maximum amount of hydrophobic starch is governed by desired consistency of the final product. A good overall balance of properties is achieved when the hydrophobic starch is in an amount from 30 to 60% by weight of the total composition, with the best results being achieved when the hydrophobic starch is in an amount from 40 to 50% by weight of the total composition.

As will be readily apparent to those skilled in the art, modifying agents that are conventionally included in petrolatum-containing compositions may be used such as agents to modify the consistency or melting point of the composition (e.g. mineral oil, microcrystalline waxes, silicone oils).

As indicated hereinbefore petrolatum compositions are well known to those skilled in the art (see, for example, U.K. Pat. No. 882,742 and U.S. Pat. No. 2,661,318).

Petrolatum or petroleum jelly for topical application to humans has traditionally been derived from asphalt-free crude petroleums by removal by distillation of the more volatile fractions to leave an undistilled residue. Accordingly, it contained much oil of a wide range of viscosities and molecular weights, and included more or less the relatively coarse crystalline type of paraffin closely resembling or identical with the ordinary paraffin wax of commerce.

In recent years, petrolatum has been made synthetically by blending mineral oil and microcrystalline waxes or paraffinic waxes or both with the objective of yielding a semisolid mixture of hydrocarbons that after decolorization meets the physical standards of the U.S.P. and N.F. for White Petrolatum and Petrolatum respectively. The Vaseline Petroleum Jelly employed in the improved petrolatum formulation of the instant invention is such a decolorized synthetic blend containing mineral oil having a viscosity of 200 SSU or higher at 100°F. and 30% or more microcrystalline wax or paraffinic wax or both.

The following Examples I through IV illustrate improved petrolatum formulations of the instant invention.

EXAMPLE I

40% Vaseline Petroleum Jelly
40% ANM Starch
20% Mineral Oil (175–185 SSU viscosity)

EXAMPLE II

45% Dry-Flo Starch
36.7% Vaseline Petroleum Jelly
18.3% Mineral Oil (175-185 SSU viscosity)

EXAMPLE III

Vaseline Petroleum Jelly
ANM Starch
Mineral Oil (175–185 SSU viscosity)
No. 555 Silicone Oil

EXAMPLE IV

40% Vaseline Petroleum Jelly
40% Dry-Flo Starch
9.9% Mineral Oil (175–185 SSU viscosity)
10% No. 555 Silcone Oil
0.1% Fragrance

EXAMPLE V 54.9% Vaseline White Petroleum Jelly
45% Dry-Flo Starch
0.1% Fragrance

EXAMPLE VI 54.9% Vaseline White Petroleum Jelly
45% ANM Starch
0.1% Fragrance

EXAMPLE VII 54.9% Vaseline Yellow Petroleum Jelly
45% Dry-Flo Starch
0.1% Fragrance In preparing the solid petrolatum compositions of this invention, the following procedure may be used:

a. Melt petroleum jelly and heat to approximately 160°F.
b. Put required weight of melted petroleum jelly into Waring Blendor with speed control.
c. Under agitation at low speed, add hydrophobic starch to the melted petroleum jelly in a steady stream to avoid formation of lumps. If mineral oil is to be included, it is added slowly when starch is well dispersed and agitation is continued at low speed.
d. Adjust to full speed of the Waring Blendor and agitate for approximately three minutes, making sure temperature does not exceed 175°F.
e. Reduce agitation to low speed and allow to cool.
f. Add fragrance when temperature falls to 100°F. and mix 1 minute at full speed.
g. Put product through a hand homogenizer twice before filling into jars or tubes.

What is claimed is:

1. A solid petrolatum composition comprising a blend of solid petrolatum and a hydrophobic starch comprising an aluminum salt of a low-substituted starch half-ester of octenyl succinic acid, wherein said starch is present in an amount sufficient to reduce the composition's greasy appearance and greasy feel and its resistance to washing with cold water and soap or detergent compositions.

2. The solid petrolatum composition of claim 1, wherein the amount of said starch present in the composition is from about 30 to 60% by weight of the total composition.

* * * * *